UNITED STATES PATENT OFFICE.

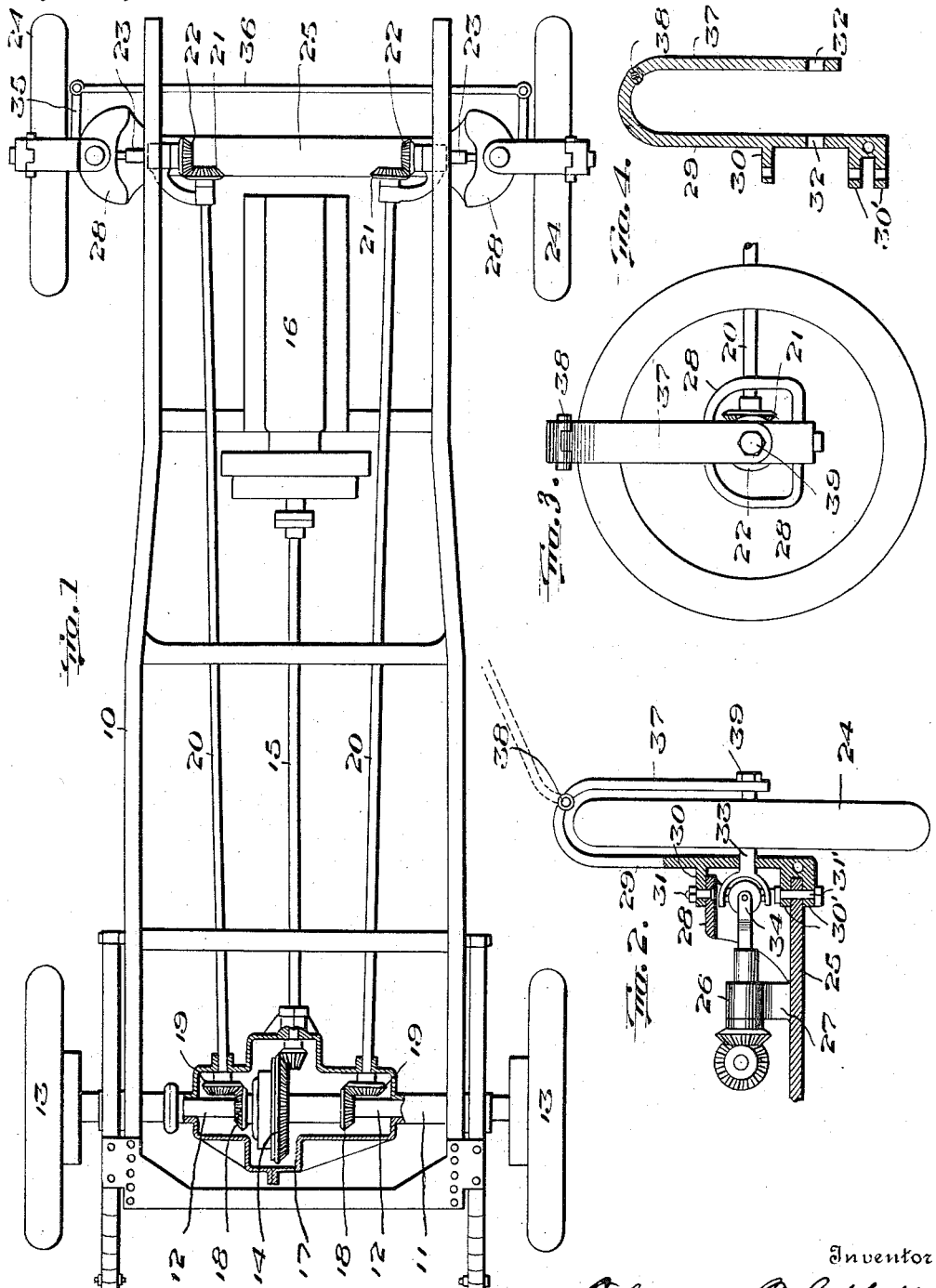

THOMAS F. LEDBETTER, OF COLUMBUS, GEORGIA.

DRIVING-GEAR AND WHEEL-MOUNTING FOR MOTOR-VEHICLES.

1,244,512.   Specification of Letters Patent.   Patented Oct. 30, 1917.

Application filed October 27, 1916. Serial No. 128,051.

*To all whom it may concern:*

Be it known that I, THOMAS F. LEDBETTER, a citizen of the United States, residing at Columbus, in the county of Muskogee and State of Georgia, have invented new and useful Improvements in Driving-Gears and Wheel-Mountings for Motor-Vehicles, of which the following is a specification.

This invention relates to motor vehicles, and has particular reference to the driving mechanism, and the mounting for the steering wheels of the vehicle.

It is an object of this invention to provide an improved driving mechanism for vehicles whereby all the wheels thereof are positively driven from a single source of power, this mechanism being simple in structure and efficient and practical in operation.

It is a further object of the invention to provide an improved mounting for the steering wheels of the vehicle, which will permit ready turning of the wheels to facilitate guiding of the machine; which will serve as a brace or support for the outer end of the axle on which the steering wheel is mounted; which will permit the wheel to be removed from its axle; and which is of simple construction but relatively strong in character, so that it is enabled to resist or withstand all stresses and strains exerted upon it.

Referring to the drawings,

Figure 1 is a top plan view of a portion of the chassis of an automobile showing my improvements applied thereto.

Fig. 2 is a front elevational view, partly in section, of a portion of the vehicle showing my improved mounting for the steering wheel.

Fig. 3 is an outside elevational view of one of the steering wheels showing my improved mounting therefor.

Fig. 4 is an elevational view of the improved bracket or yoke in which the steering wheels are adapted to be mounted.

Referring to the drawings wherein like numerals represent like parts in the several views, 10 designates the chassis of an automobile which may be of any suitable construction, only a part of the chassis being shown in the drawings, as it forms no part of my invention. Rotatably mounted within the rear axle 11 of the vehicle are shaft sections 12 carrying at their outer ends the rear wheels 13. The rear shaft sections 12 are driven through the differential gearing 14 and the drive shaft 15 by the engine 16, the latter of which is shown conventionally, as it may be of any desired type.

The differential gearing 14 is housed within a casing or housing 17 forming part of the axle 11 and mounted upon each of the rear shaft portions 12, and, preferably, located within the housing 17, is a bevel gear 18, which gears are distinct from the differential gearing. Each of the gears 18 mesh with a corresponding gear 19 fixed upon the rear end of a driven shaft 20 having a suitable bearing in the casing 17. The driven shafts 20 extend forwardly of the chassis and each is provided at its forward end with a bevel gear 21 meshing with a similar gear 22 secured to the inner end of a driven stub shaft 23 on which the front wheel 24 is fixedly secured.

It will be seen from the structure above described that the front wheels are geared or connected up to the rear axles and all of the wheels of the vehicle are operable from the same differential gearing and are driven from a single engine. When the engine 16 is in operation, the rear shafts 12 are rotated so as to drive the rear wheels and at the same time the stub shafts 23 carrying the wheels 24 are driven through the shafts 20, and the different distances over which both the front and rear wheels must pass when the automobile is turning a corner is taken care of by the same differential gearing.

25 designates the front axle of the vehicle rigidly secured to the chassis and having adjacent either end a bearing 26 carried by an upright 27, in which bearings said stub shafts 23 are rotatably mounted. At the opposite ends of the fixed axle 25 are brackets comprising arches 28, which arches are preferably integral with the axle 25 and through the opening in the arches the stub shafts 23 are adapted to pass.

My mounting for the steering wheels, in the present instance, the front wheels, comprises an inverted U-shaped yoke or bracket 29, which yoke is adapted to be inserted over the wheel in the manner shown. The yoke is preferably cast from metal, and is provided with an ear 30 adapted to overlie the upper part of the arch 28 and a pivot pin 31 is adapted to pass through registering openings in the arch and ear.

The yoke is, furthermore, provided with a pair of ears 30' between which the outer end of the front axle 25 is received, and these ears are connected to the axle by means of a pivot pin 31', which pin is in alinement with pin 31, so that the yoke together with the wheel mounted therein may swing about a vertical axis.

The arms of the yokes 29 have suitable openings 32 in alinement with each other and forming bearings in which the axle 33 of the wheel is adapted to rotate. Interposed in the stub-shafts 23 are suitable universal joints 34 which permit the steering wheels to swing about the pins 31 and 31', and these universal joints may be of any suitable construction, the type shown in the drawings being by way of illustration only. Extending outwardly from the brackets 29 are arms 35 to which are pivotally connected the opposite ends of the connecting rod 36, which causes the wheels to turn in unison.

To facilitate the removal of the steering wheel from its shaft, I hinge the depending outer arm 37 of the yoke adjacent its upper end, as at 38, so that when it is desired to remove the wheel 24, from its shaft, or to mount the wheel in place thereon, all that is necessary is to remove the nut 39 from the outer end of the shaft, and then swing the arm 37 into the raised position shown in dotted lines, Fig. 2.

It will be noted that the yoke or bracket 29 is secured to the front axle 25 and arch 28, and thus a plurality of pivotal points are provided on which the strain is distributed. The arm 37 of the yoke provides a bearing for the outer end of the axle or shaft upon which the steering wheel is mounted, so that the strain exerted upon the wheel is distributed between this bearing and the bearing on the side of the wheel toward the chassis. The bracket is very simple in construction, and may be manufactured at a relatively low cost, and the wheel may be readily placed within the bracket or removed therefrom by merely swinging the arm 37 into raised position.

It is, of course, obvious that my invention is susceptible of various modifications and changes which would be within the skill of the ordinary mechanic, and which would not depart from the scope of the following claims.

What I claim is:—

1. A mounting for steering wheels of motor vehicles comprising, in combination, a fixed axle, a driven rotatable shaft mounted in bearings on said axle, a wheel on said driven shaft, and a yoke having a pair of arms straddling said wheel, said yoke being pivoted to said fixed axle adjacent said shaft and having a bearing in its outer arm adapted to receive the outer end of said shaft.

2. A mounting for steering wheels of motor vehicles comprising, in combination, a fixed axle, a driven shaft mounted on said axle, a wheel on said driven shaft, a yoke having a pair of arms straddling said wheel, bearings in each of said arms in which said shaft is rotatably mounted, and means for pivotally connecting said yoke to said axle at points above and below said shaft.

3. A mounting for steering wheels of motor vehicles comprising, in combination, a shaft, a wheel on the shaft, and a pivoted yoke having in its outer arm a bearing adapted to receive the outer end of the shaft, said outer arm being hinged to permit removal of the wheel from the shaft.

4. A mounting for steering wheels of motor vehicles comprising, in combination, a shaft, a wheel on the shaft, a pivoted yoke having its arms straddling said wheels, and bearings in both of said arms for the reception of said shaft, the outer arm of said yoke being pivoted to permit removal of the wheel from said shaft.

5. In combination, a fixed axle, a bracket on said fixed axle; a shaft projecting through said bracket; a yoke having an ear pivotally connected to said bracket and a pair of ears straddling the end of said fixed axle and pivotally connected thereto, said yoke being in the form of an inverted U, and being adapted to receive the wheel between its arms; and bearings in the arms of said yoke for the reception of the shaft.

6. A mounting for steering wheels of motor vehicles comprising, in combination, a fixed axle, a driven shaft mounted on said axle, a wheel on said driven shaft, a yoke having a pair of arms straddling said wheel, bearings in each of said arms in which said shaft is rotatably mounted, means for pivotally connecting the lower end of the inner arm of said yoke to the fixed axle, and a universal joint between the axle and inner arm of said yoke in vertical alinement with the pivotal points of said yoke.

7. In combination, a fixed axle, an upright on said fixed axle and having a bearing, an arm extending from said upright, a stub shaft mounted in the bearing of said upright, a gear on said stub shaft, a driven shaft having a bearing in said arm, a gear on said driven shaft meshing with said first gear, an arch at one end of said axle and through which said stub shaft projects, a yoke pivotally connected to said arch and said fixed axle, said yoke being in the form of an inverted U and being adapted to receive the wheel between its arms, and bearings in the arms of said yoke for the reception of said stub shaft.

In testimony whereof I have hereto set my hand.

THOMAS F. LEDBETTER.